United States Patent
Sakon et al.

(10) Patent No.: US 10,889,119 B2
(45) Date of Patent: Jan. 12, 2021

(54) WIPING DEVICE, WIPING MEMBER, LIQUID DISCHARGING DEVICE, AND WIPING METHOD

(71) Applicants: Yohta Sakon, Kanagawa (JP); Hiroko Ohkura, Kanagawa (JP); Takumi Atake, Kanagawa (JP); Akira Izutani, Osaka (JP)

(72) Inventors: Yohta Sakon, Kanagawa (JP); Hiroko Ohkura, Kanagawa (JP); Takumi Atake, Kanagawa (JP); Akira Izutani, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/725,252

(22) Filed: Dec. 23, 2019

(65) Prior Publication Data
US 2020/0207099 A1 Jul. 2, 2020

(30) Foreign Application Priority Data
Dec. 26, 2018 (JP) .................. 2018-243178

(51) Int. Cl.
*B41J 2/165* (2006.01)
*B32B 9/04* (2006.01)

(52) U.S. Cl.
CPC .......... *B41J 2/16552* (2013.01); *B32B 9/047* (2013.01); *B41J 2/16535* (2013.01);
(Continued)

(58) Field of Classification Search
CPC ............ B41J 2/16552; B41J 2/16535; B41J 2002/1655; B41J 2002/16558; B32B 9/047; B32B 2307/726; B32B 2432/00
See application file for complete search history.

(56) References Cited

U.S. PATENT DOCUMENTS 9,067,415 B2 * 6/2015 Fukuda ............... B41J 2/16505
9,139,006 B2 * 9/2015 Kobayashi .......... B41J 2/16535
(Continued)

FOREIGN PATENT DOCUMENTS

CN 203246190 U 10/2013
CN 103600531 A 2/2014
(Continued)

OTHER PUBLICATIONS

Extended European Search Report dated May 26, 2020 in European Patent Application No. 19219024.7, 13 pages.
(Continued)

*Primary Examiner* — Huan H Tran
(74) *Attorney, Agent, or Firm* — Oblon, McClelland, Maier & Neustadt, L.L.P.

(57) ABSTRACT

A wiping device includes a wiping member configured to wipe a nozzle forming surface of a liquid discharging head that discharges a liquid from a nozzle, the wiping member containing fabric; and a pressing member configured to press the wiping member to the liquid discharging head, wherein the wiping member satisfies the following relationship 1: 0.8<(Sb/Ss)<1.2, relationship 1, where, at 60 seconds after a coloring liquid containing a coloring material and distilled water is dripped onto a surface of the wiping member in contact with the nozzle forming surface and Ss represents a spreading area of the coloring material on the surface of the wiping member in contact with the nozzle forming surface and Sb represents a spreading area of the coloring material on a surface of the wiping member not in contact with the nozzle forming surface.

10 Claims, 4 Drawing Sheets

(52) U.S. Cl.
CPC ..... *B32B 2307/726* (2013.01); *B32B 2432/00* (2013.01); *B41J 2002/1655* (2013.01); *B41J 2002/16558* (2013.01)

(56) References Cited

U.S. PATENT DOCUMENTS

2014/0292919 A1* 10/2014 Kobayashi ........... B41J 2/16535
           347/33
2018/0264821 A1    9/2018 Sato et al.
2019/0283430 A1    9/2019 Atake

FOREIGN PATENT DOCUMENTS

| | | | |
|---|---|---|---|
| CN | 103847236 A | 6/2014 | |
| CN | 104070812 A | 10/2014 | |
| CN | 108179545 A | 6/2018 | |
| CN | 108374237 A | 8/2018 | |
| CN | 108621582 A | 10/2018 | |
| JP | 2010-234667 | 10/2010 | |
| JP | 2011-126129 * | 6/2011 | ............. B41J 2/165 |
| JP | 2014-104746 A | 6/2014 | |
| JP | 2014-188900 | 10/2014 | |
| JP | 2019-147261 | 9/2019 | |

OTHER PUBLICATIONS

Office Action dated Nov. 9, 2020, in corresponding Chinese application No. 2019/11362543.7.

\* cited by examiner

WIPING DEVICE, WIPING MEMBER, LIQUID DISCHARGING DEVICE, AND WIPING METHOD

CROSS-REFERENCE TO RELATED APPLICATIONS

This patent application is based on and claims priority pursuant to 35 U.S.C. § 119 to Japanese Patent Application No. 2018-243178, filed on Dec. 26, 2018, in the Japan Patent Office, the entire disclosure of which is hereby incorporated by reference herein.

BACKGROUND

Technical Field

The present disclosure relates to a wiping device, a wiping member, a liquid discharging device, and a wiping method.

Description of the Related Art

In a liquid discharging device represented by an inkjet printer, foreign matter on a nozzle forming surface causes a problem such as defective discharging. Therefore, the nozzle forming surface requires regular cleaning. A cleaning method using a wiping member for cleaning a nozzle forming surface formed by combining a sheet-shaped wiping member represented by non-woven fabric and woven fabric has been proposed.

SUMMARY

According to embodiments of the present disclosure, provided is a wiping device which includes a wiping member configured to wipe a nozzle forming surface of a liquid discharging head that discharges a liquid from a nozzle, the wiping member comprising fabric; and a pressing member configured to press the wiping member to the liquid discharging head, wherein the wiping member satisfies the following relationship 1: $0.8<(Sb/Ss)<1.2$, relationship 1, where, at 60 seconds after a coloring liquid containing a coloring material and distilled water is dripped onto a surface of the wiping member in contact with the nozzle forming surface and Ss represents a spreading area of the coloring material on the surface of the wiping member in contact with the nozzle forming surface and Sb represents a spreading area of the coloring material on a surface of the wiping member not in contact with the nozzle forming surface.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
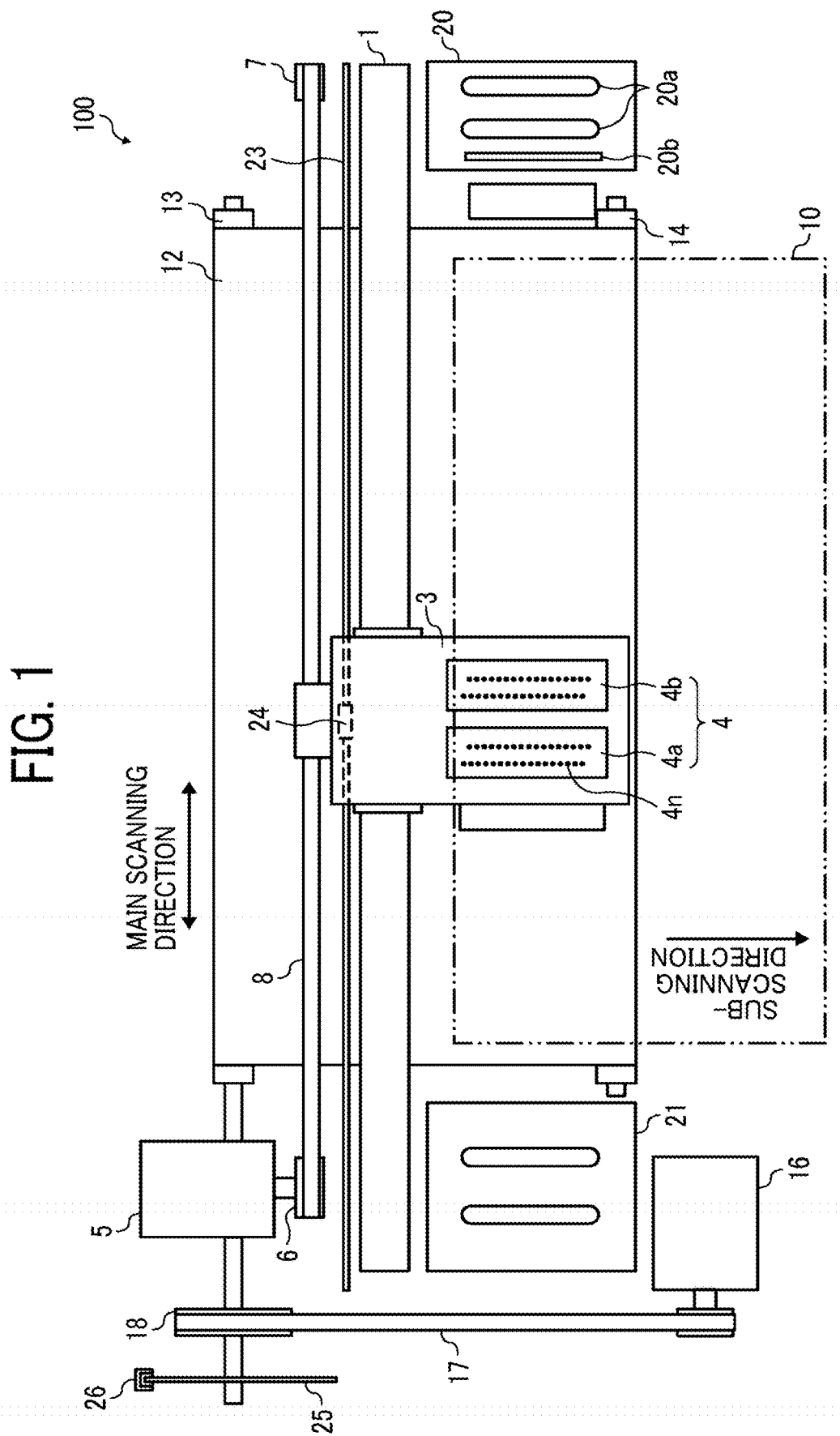
FIG. 1 is a schematic diagram illustrating an example of an image forming device incorporating a wiping device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, provided is a wiping device capable of easily removing liquid adhering to a nozzle forming surface.

A wiping device has been proposed in JP-2014-188900-A1 which relatively moves a liquid jetting head that jets a liquid dispersion in which solid particles are dispersed in liquid against a wiping member to wipe off the liquid dispersion adhering to a nozzle forming surface. This wiping member has a first layer on the nozzle forming surface side and a second layer sandwiching the nozzle forming surface with the first layer. The first layer has a void that can guide liquid droplets as the dispersion medium of the liquid dispersion that adheres to the nozzle forming surface to the second layer due to the capillary action and can capture and contain the dispersoid of the liquid dispersion. The second layer absorbs the dispersion medium.

However, in the cleaning method using a typical wiping member, it is difficult to remove liquid adhering to a nozzle forming surface.

Next, embodiments of the present disclosure are described.

Image Forming Device, Wiping Device, and Wiping Method

The wiping device of the present disclosure includes a wiping member and has other optional devices such as a cleaning liquid, a heating device, and a control device.

The wiping member is described later. Moreover, the wiping method executed by the wiping device includes applying and other optional steps. The wiping device causes the wiping member to contact the nozzle forming device that discharges a liquid from a nozzle to wipe the nozzle forming surface. Further, when the wiping member wipes the nozzle forming surface, it is preferable that a cleaning liquid have been applied to the nozzle forming surface. Specifically, it is more preferable that the nozzle forming surface be wiped using a wiping member impregnated with a cleaning liquid and as a result, the cleaning liquid be applied to the nozzle forming surface. In the present embodiment, wiping refers to relative moving of the wiping member against the liquid discharging head while bringing the wiping member into contact with the nozzle forming surface. By wiping the nozzle forming surface using the wiping member, for example, it is possible to remove dried liquid matter adhering to the nozzle forming surface from the nozzle forming surface. Specifically, such dried liquid matter is physically removed from the nozzle forming surface by the wiping member and it is possible to dissolve or swell such dried and fixed matter with a cleaning liquid to cause the wiping member to absorb and remove it. In addition, for example, it is possible to absorb extra liquid overflowing from the nozzle to remove it from the nozzle forming surface.

Figure 2:
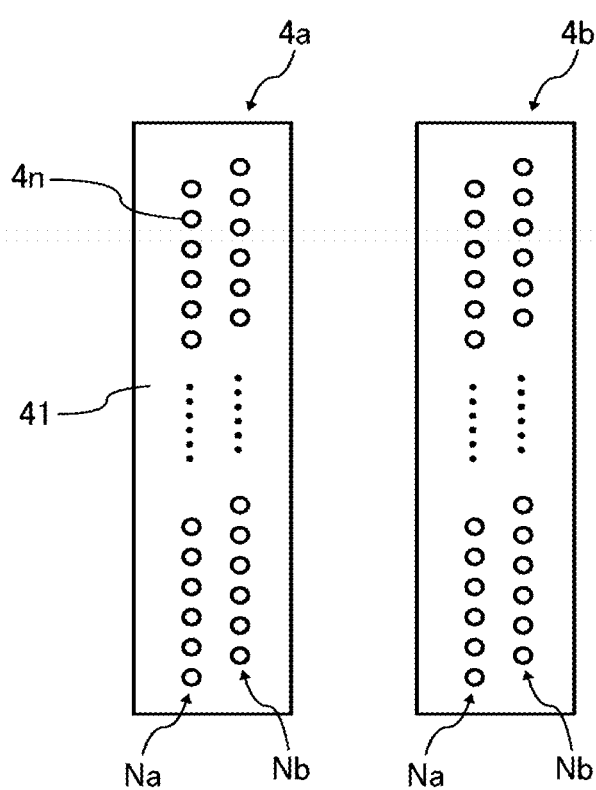
FIG. 2 is a schematic diagram illustrating an example of the nozzle forming surface of a liquid discharging head.
Figure 3:
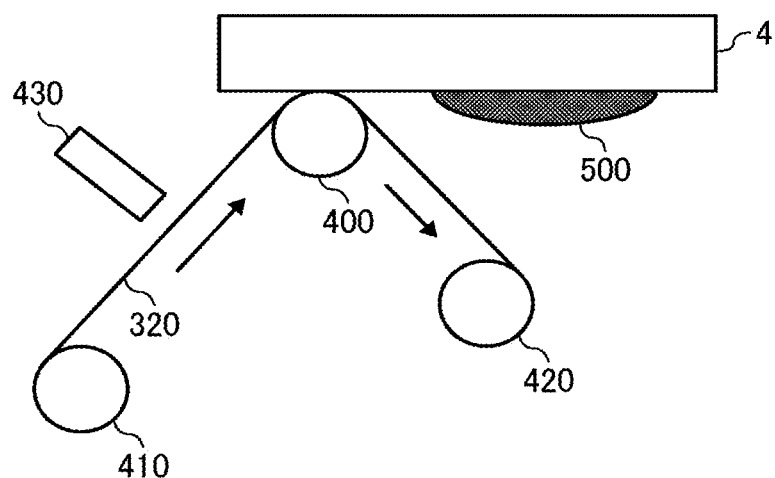
FIG. 3 is a schematic diagram illustrating an example of a wiping device.

Next, the wiping device will be described taking an image forming device as an example of a liquid discharging device 100 incorporating this wiping device with reference to FIGS. 1 to 3. The image forming device discharges ink as an example of the liquid. FIG. 1 is a schematic diagram illustrating an example of an image forming device incorporating a wiping device. FIG. 2 is a schematic diagram illustrating an example of the nozzle forming surface of a liquid discharging head. FIG. 3 is a schematic diagram illustrating an example of the wiping device.

The image forming device illustrated in FIG. 1 is a serial type liquid discharging device. The image forming device includes a carriage 3 which is movably held by a main guide member 1 and a sub-guide member, that are bridged between the left and right side plates. A main scanning motor 5 drives the carriage 3 to reciprocate in the main scanning direction (carriage moving direction) via a timing belt 8 stretched around a drive pully 6 and a driven pully 7. The carriage 3 carries recording heads 4a and 4b (referred to as recording head 4 if distinction thereof is not necessary) as examples of the liquid discharging heads. The recording head 4 discharges color ink droplets of, for example, yellow (Y), cyan (C), magenta (M), and black (K). The recording head 4 carries nozzle arrays, each having multiple nozzles 4n disposed along the sub-scanning direction vertical to the main scanning direction with the ink discharging surface downward.

As illustrated in FIG. 2, the recording head 4 includes two nozzle arrays Na and Nb, each including multiple nozzles 4n on a nozzle forming surface 41. As the liquid discharging head constituting the recording head 4, for example, it is possible to use a piezoelectric actuator such as a piezoelectric element and a thermal actuator that utilizes the phase change caused by film boiling of liquid by using an electric heat conversion element such as a heat element.

The image forming device illustrated in FIG. 1 has a conveyor belt 12 serving as a conveying device to convey a sheet 10 by electrostatic adsorption at the position facing the recording head 4. The conveyor belt 12 takes an endless form and stretched around a conveyor roller 13 and a tension roller 14. The conveyor belt 12 is moved around in the sub-scanning direction by the conveyor roller 13 rotationally driven by a sub-scanning motor 16 via a timing belt 17 and a timing pully 18. This conveyor belt 12 is charged (charges are applied) by a charging roller while circulating.

At one end in the main-scanning direction of the carriage 3, a maintenance and recovery assembly 20 configured to maintain and recover the recording head 4 is disposed lateral to the conveyor belt 12. On the other end, a dummy discharging receiver 21 configured to receive dummy discharge by the recording head 4 is disposed lateral to the conveyor belt 12. The maintenance and recovery assembly 20 includes, for example, a capping member 20a to cap the nozzle forming surface (surface on which the nozzle is formed) 41 of the recording head 4, a wiping assembly 20b that wipes the nozzle forming surface 41, and the dummy discharging receiver 21 that receives droplets not used for forming an image.

Further, the image forming device includes an encoder scale 23 that has a predetermined pattern and is stretched between both side plates along the main scanning direction of the carriage 3. Further, the carriage 3 includes an encoder sensor 24 formed of a transmission type photo sensor that reads the pattern of the encoder scale 23. These encoder scale 23 and the encoder sensor 24 constitute a linear encoder (main scanning encoder) to detect the movement of the carriage 3.

In addition, a code wheel 25 is mounted onto the shaft of the conveyor roller 13, and an encoder sensor 26 is provided which has a transmissive photosensor to detect the pattern formed on the code wheel 25. These code wheel 25 and encoder sensor 26 constitute a rotary encoder (sub-scanning encoder) to detect the moving and the position of the conveyor belt 12.

In the image forming device having such a configuration, the sheet 10 is fed onto the charged conveyor belt 12, adsorbed thereto, and conveyed along the sub-scanning direction in accordance with the rotation of the conveyor belt 12. By driving the recording head 4 in response to the image signal while moving the carriage 3 in the main-scanning direction, ink droplets are discharged onto the sheet 10 standing still to record an image in an amount of one line. After the sheet 10 is conveyed in a predetermined amount, the next line is recorded. On receiving a signal indicating that the recording is finished or the rear end of the sheet 10 has reached the image recording region, the recording operation stops, and the sheet 10 is ejected to an ejection tray.

In addition, the carriage 3 is moved in the printing (recording) standby mode to the maintenance and recovery assembly 20 to clean the recording head 4 by the maintenance and recovery assembly 20. Alternatively, the recording head 4 may not be moved and the maintenance and recovery assembly 20 may move to clean the recording head 4. The recording head 4 illustrated in FIG. 1 has two nozzle arrays Na and Nb, each including multiple nozzles 4n, as illustrated in FIG. 2. The nozzle array Na of the recording head 4a discharges black (K) liquid droplets and the other nozzle array Nb discharges cyan (C) liquid droplets. The nozzle array Na of the recording head 4b discharges magenta (M) liquid droplets and the other nozzle array Nb discharges yellow (Y) liquid droplets.

An example of the wiping device is the wiping assembly 20b that wipes the nozzle forming surface 41. As illustrated in FIG. 3, the wiping assembly 20b includes a sheet-like wiping member 320, which is an example of the wiping member, a delivery roller 410 that delivers the sheet-like wiping member 320 in the direction of conveyance (direction indicated by the arrow in FIG. 3), a cleaning liquid dropping device 430, which is an example of the cleaning liquid application device to apply a cleaning liquid to the sheet-like wiping member 320 delivered, a pressing roller 400 as an example of a pressing member pressing the sheet-like wiping member 320 to which the cleaning liquid has been applied against the nozzle forming surface 41, and a reel-up roller 420 to collect the sheet-like wiping member 320 used for wiping. The cleaning liquid is supplied from a cleaning liquid storage container that stores the cleaning liquid through a cleaning liquid supply tube provided with a pump for supplying the cleaning liquid in the middle. In addition to the sheet-like wiping member 320, the wiping assembly 20*b* that wipes the nozzle forming surface 41 may optionally include a rubber blade, etc., to wipe the nozzle forming surface 41. The pressing roller 400 uses a spring to adjust the distance between the cleaning unit and the nozzle forming surface 41, thereby adjusting the pressing force. The pressing force may be adjusted as appropriate according to the width of the nozzle forming surface 41 and the width of the pressing roller 400. For example, when the sheet-like wiping member 320 is pressed against the nozzle forming surface 41 with a width of 3 cm, it is preferable to set a pressing force of from 2 to 4 N. By setting an appropriate pressing force, it is possible to strike a balance between enhancement of the wiping performance for the nozzle forming surface 41 and reduction of deterioration thereof caused by abrasion. The sheet-like wiping member 320 relatively moves while in contact with the nozzle forming surface 41 by the pressing roller 400. The moving speed in the relative movement between the sheet-like wiping member 320 and the nozzle forming surface 41 can be appropriately adjusted. For example, it is preferably from 30 to 100 mm/s. The smaller the moving speed, the better the wiping performance. It is preferable to comprehensively set the moving speed in consideration of productivity. The pressing member is not limited to a roller but can be a fixed member made of plastic or rubber. When the wiping assembly 20*b* includes a rubber blade, etc., an assembly for bringing the rubber blade, etc., into contact with the sheet-like wiping member 320 is provided to impart a cleaning ability of the rubber blade, etc., to the sheet-like wiping member 320. Further, by adjusting the delivery amount of the sheet-like wiping member 320 by the delivery roller 410 and the winding amount of the sheet-like wiping member 320 by the reel-up roller 420, the tension generated in the sheet-like wiping member 320 can be adjusted. Moreover, although it is preferable that the sheet-like wiping member 320 be held in a roll-up state as illustrated in FIG. 3 in terms of downsizing, the sheet-like wiping member 320 is not limited thereto and may be folded. The cleaning liquid applying device is not limited to the cleaning liquid dripping device. For example, it includes a cleaning liquid applying roller for applying the cleaning liquid with a roller and a cleaning liquid applying spray for applying the cleaning liquid with a spray. Further, the cleaning liquid application executed by the cleaning liquid application device is not particularly limited as long as the cleaning liquid can be applied to the nozzle forming surface 41. In addition to the indirect cleaning liquid application via the cleaning liquid application device as in the embodiment described above, it is possible to directly apply the cleaning liquid to the nozzle forming surface 41. However, it is preferable to indirectly apply the cleaning liquid via the cleaning liquid applying device.

In the present embodiment, as an example of the wiping, after applying the cleaning liquid to the sheet-like wiping member 320 in a predetermined amount, the recording head 4 and the wiping assembly 20*b* relatively move to each other while the sheet-like wiping member 320 is pressed against the nozzle forming surface 41 to wipe off foreign matter 500 adhering to the nozzle forming surface 41. Examples of the foreign matter 500 adhering to the nozzle forming surface 41 include, but are not limited to, mist ink produced during discharging of the ink from the nozzles 4*n*, ink adhering to the nozzle forming surface 41 when the ink is sucked from the nozzles 4*n* during, for example, cleaning, adhesion ink which is mist ink or ink adhering to the cap member dried on the nozzle forming surface 41, and paper dust produced from printed matter. In the present embodiment, the foreign matter 500 is wiped off after the cleaning liquid is applied to the wiping member that does not contain the cleaning liquid. However, a wiping member that contains the cleaning liquid in advance can be used without using the cleaning liquid applying device. Moreover, the cleaning liquid can be applied to a portion other than the wiping member. For example, the cleaning liquid can be directly applied to the nozzle forming surface 41. That is, the cleaning liquid applied to the nozzle forming surface means all the types of cleaning liquids applied to the nozzle forming surface. For example, it includes a cleaning liquid directly applied to the nozzle forming surface and a cleaning liquid indirectly applied to the nozzle forming surface via a wiping member containing the cleaning liquid. The latter is preferable to the former. Furthermore, if the ink is assumed to be dried and adhere to the nozzle forming surface as a result of a long standby period of time, etc., a configuration is preferable which wipes the nozzle forming surface multiple times with the wiping member containing the cleaning liquid to remove the dried ink. Although it is preferable to wipe a nozzle forming surface with a wiping member using a cleaning liquid, the nozzle forming surface may be wiped with a wiping member without using a cleaning liquid.

Wiping Member

Figure 4:
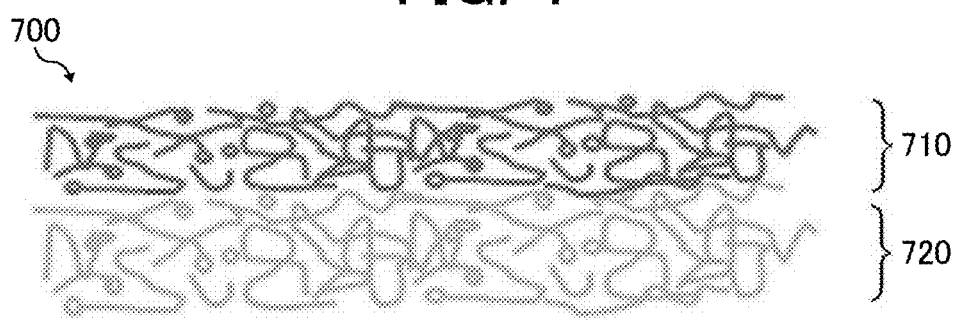
FIG. 4 is a schematic diagram illustrating an example of the cross section of the sheet-like wiping member.

Next, the wiping member will be described with reference to FIG. 4. FIG. 4 is a schematic diagram illustrating an example of the cross section of the wiping member having a sheet-like form. A wiping member 700 illustrated in FIG. 4 is, for example, a double-layer non-woven fabric and has a first layer 710 that is brought into contact with the nozzle forming surface to wipe the nozzle forming surface of a liquid discharging head and a second layer 720 (layer other than the first layer) having a rear surface that is not brought into contact with the nozzle forming surface. The wiping member may take a single layer structure, a three-layer structure lined with a film to prevent strike through of ink and reinforce the strength of the wiping member or a multi-layer structure having multiple absorbing layers having different absorptivity, which are provided as the second layer or thereafter. That is, the wiping member may have a single layer structure and also a laminated structure having at least one layer other than the first layer may be used.

Next, the properties of the wiping member will be described. The wiping member of the present disclosure is made of fabric and satisfies the following relationship 1: $0.8<(Sb/Ss)<1.2$ relationship 1, where, at 60 seconds after a coloring liquid containing a coloring material and distilled water is dripped onto the surface of the wiping member in contact with the nozzle forming surface, Ss represents a spreading area of the coloring material on the surface of the wiping member in contact with the nozzle forming surface and Sb represents a spreading area of the coloring material on the surface of the wiping member not in contact with the nozzle forming surface. First, the details of the relationship 1 will be described. The relationship 1 regulates the spreading property of a liquid in the wiping member, which is defined as the following spreading property of liquid in the wiping member.

$$0.8<Sb/Ss<1.2 \qquad \text{Relationship 1}$$

Spreading Property of Liquid in Wiping Member

The spreading property of a liquid in the wiping member is determined by, after a coloring material containing a coloring material and distilled water is dripped onto the surface of a wiping member in contact with a nozzle forming surface, calculating the spreading area Sb of the coloring material on the surface of the wiping member in contact with the nozzle forming surface and the spreading area Ss of the coloring material on the surface of the wiping member not in contact with the nozzle forming surface.

The coloring liquid contains distilled water and edible red No. 104 (produced by Daiwa Dyestuff Mfg. Co., Ltd.). The proportion of the edible red No. 104 in the total amount of the coloring liquid is 0.2 percent by mass. In addition, the coloring liquid is dripped onto a wiping member set with a surface in contact with the nozzle forming surface up, i.e., the surface in contact with the nozzle forming surface is placed against the direction of gravity. At this time, the dripping amount of the coloring liquid onto a wiping member is 15 μL.

When 60 seconds have passed since the coloring liquid is dripped onto a wiping member, the surface of the wiping member in contact with the nozzle forming surface and the surface of the wiping member not in contact with the nozzle forming surface are photographed to calculate the area of the red region formed by the coloring material of the coloring liquid. The area of the red region on the surface of the wiping member in contact with the nozzle forming surface is represented by the spreading area Ss and the area of the red region on the surface of the wiping member not in contact with the nozzle forming surface is represented by the spreading area Sb.

Figure 5:
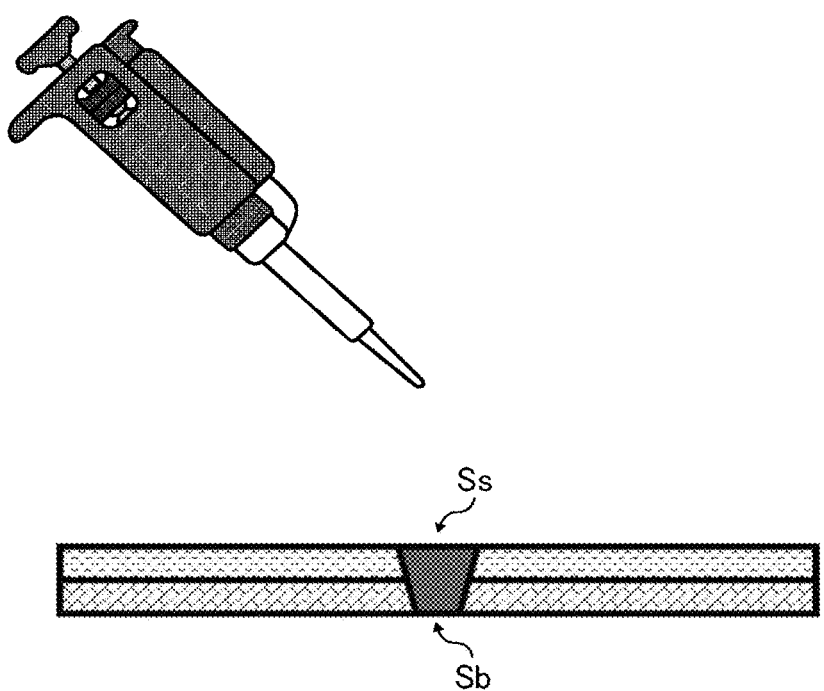
FIG. 5 is a schematic diagram illustrating an example of a state of a coloring liquid dripped onto a wiping member.

The ratio (Sb/Ss) of the spreading area Sb to the spreading area Ss indicates the spreading state of the liquid wiped off by the wiping member in the wiping member and is an index of suitably removing the liquid adhering to the nozzle forming surface. FIG. 5 is a schematic diagram illustrating an example of the state of the coloring liquid dripped onto the wiping member. As illustrated in FIG. 5, the coloring liquid penetrates the inside of the wiping member and forms the spreading area Ss, which is the area of the red region on the surface of the wiping member in contact with the nozzle forming surface and the spreading area Sb, which is the area of the red region on the surface of the wiping member not in contact with the nozzle forming surface.

The wiping member of the present embodiment removes the liquid adhering to the nozzle forming surface. Also, it is possible to apply a cleaning liquid to the wiping member before wiping to remove the liquid. Therefore, the wiping member can be impregnated with the liquid adhering to the nozzle forming surface and the cleaning liquid. The liquid and the cleaning liquid are preferably present inside the wiping member in such a state in which both are prevented from spreading inside the wiping member along the surface direction or both are prevented from spreading along the direction of the surface on the side of the surface of the wiping member in contact with the nozzle forming surface and rapidly spreading from the side of the surface in contact with the nozzle forming surface to the side of the surface not in contact with the nozzle forming surface. These preferable states can be realized in the wiping member when the spreading area Ss and the spreading area Sb satisfy the relationship 1.

When the former preferable state in which both are prevented from spreading inside the wiping member along the surface direction is realized, the using amount of the wiping member in the wiping device can be reduced. In most cases, a wiping member formed of a nonwoven fabric, etc. is mounted onto a wiping device in a state in which the wiping member is reeled up. However, since a liquid wiped off from a nozzle surface is not prevented from spreading inside a typical wiping member in the direction of the surface, the mass of the wiping member increases, thereby making it to difficult to reduce the size of the wiping device. Since the wiping member of the present embodiment is in the state in which both are prevented from spreading inside the wiping member along the surface direction, the mass of the wiping member mounted can be reduced, thereby reducing the size of the wiping device.

Further, the latter preferable state in which both are prevented from spreading along the direction of the surface on the side of the surface of the wiping member in contact with the nozzle forming surface and rapidly spreading from the side of the surface in contact with the nozzle forming surface to the side of the surface not in contact with the nozzle forming surface is realized, it is possible to reduce the amount of the liquid remaining on the nozzle forming surface after wiping, thereby reducing defective discharging of a nozzle ascribable to the remnant of the liquid. Since the moving speed of liquid adhering to a nozzle forming surface from the surface of a typical wiping member in contact with the nozzle forming surface to the surface of the typical wiping member not in contact with the nozzle forming surface is slower than the moving speed when using the wiping member of the present embodiment instead of the typical wiping member, the liquid is removed by the relative moving between the typical wiping member and the nozzle forming surface when the amount of the liquid remaining on the nozzle forming surface is large. This may damage the nozzle forming surface by a component such as a pigment contained in the liquid, which abrades the nozzle forming surface during wiping. In particular, it damages a water-repellent film provided to the surface until it is worn out or peeled off in some cases. The wiping member of the present embodiment has an excellent effect of diminishing the damage to the nozzle forming surface during wiping because the liquid moving speed from the surface in contact with the nozzle forming surface to the surface not in contact with the nozzle forming surface is faster.

In addition, the wiping member satisfying the relationship 1 can be produced while suitably adjusting the material and the structure of the wiping member. For example, although not particularly limited, for a wiping member including a layer having a surface in contact with the nozzle forming surface (an example of this layer is referred to as a surface layer) and a layer having a surface not in contact with the nozzle forming surface (an example of this layer is referred to as a back surface layer), properties of each layer can be adjusted. For example, the wiping ability of the wiping member can be enhanced by functionally separating the liquid wiping property for the nozzle forming surface and the liquid absorbing property of absorbing the liquid removed from the nozzle forming surface into the surface layer and the back surface layer, respectively. Hereinafter, the detail of the wiping member includes two layers is described as an example.

Layer (Surface Layer) with Surface in Contact with Nozzle Forming Surface

The surface layer of the wiping member is pressed against the liquid discharging head so that it is brought into contact with the nozzle forming surface and absorbs the liquid overflowing from the nozzle to remove the overflown liquid. In addition, when the cleaning liquid is applied to the wiping member, the surface layer applies the cleaning liquid to the nozzle forming surface to dissolve or swell the liquid dried on the nozzle forming surface and adhering thereto, thereby absorbing and removing the dried liquid from the nozzle forming surface. The form, material, size, structure, etc. of the surface layer are not particularly limited and can be appropriately selected based on the form of the nozzle forming surface to be wiped.

The material of the surface layer is not particularly limited and can be suitably selected to suit to a particular application. Examples include, but are not limited to, a nonwoven fabric such as semi-synthetic fiber cupra and a porous medium formed of synthetic fiber such as polyethylene terephthalate (PET), polypropylene (PP), polyethylene (PE), nylon (Ny), and polyvinyl alcohol (PVA), woven fabric, and knitted fabric. It is possible to suitably manufacture a surface layer and use a product available on the market.

Specific examples of the commercially available products include, but are not limited to, NE107 (cellulose) and NE507 (cellulose) (both manufactured by Asahi Kasei Corporation) and M1020-8T (PET), M2028-8T (PET), and H2070-75 (PET) (all available from Toray Industries, Inc.). Those that match requirements of the thickness, porosity, and fiber diameter of a surface layer are selected when applied to the surface layer. As the method of manufacturing a surface layer, for example, in the case of a nonwoven fabric, there are methods such as a dry process, a wet process, and an airlaid process as the web process. Examples of the binding process include methods such as a chemical bond method, a thermal bond method, and a needle punch method.

Layer (Back Surface Layer) with Surface not in Contact with Nozzle Forming Surface The back surface layer of the wiping member is not in contact with the nozzle forming surface of a liquid discharging head and holds the liquid moved from (penetrated) the surface layer, which has been removed from the nozzle forming surface. The form, material, size, structure, etc. of the back surface layer are not particularly limited and can be appropriately selected based on the form of the nozzle forming surface to be wiped.

The material of the back surface layer is not particularly limited and can be suitably selected to suit to a particular application. Examples include, but are not limited to, a nonwoven fabric such as semi-synthetic fiber cupra and a porous medium formed of synthetic fiber such as polyethylene terephthalate (PET), polypropylene (PP), polyethylene (PE), nylon (Ny), and polyvinyl alcohol (PVA), woven fabric, and knitted fabric.

It is possible to suitably manufacture a back surface layer and use a product available on the market. Specific examples of the commercially available products include, but are not limited to, NE107 (cellulose) and NE507 (cellulose) (both manufactured by Asahi Kasei Corporation) and M1020-8T (PET), M2028-8T (PET), and H2070-75 (PET) (all available from Toray Industries, Inc.). Those that match requirements of the thickness, porosity, and fiber diameter of a back surface layer are selected when applied to the back surface layer.

As the method of manufacturing a back surface layer, for example, in the case of a nonwoven fabric, there are methods such as a dry process, a wet process, and an airlaid process as the web process. Examples of the binding process include methods such as a chemical bond method, a thermal bond method, and a needle punch method.

Layer Thickness

The thickness of the surface layer (an example of the layer thickness $T_s$ of a layer having a surface in contact with the nozzle forming surface) is not particularly limited and can be appropriately adjusted to suit to an application. For example, it is preferably from 0.10 to 0.30 mm. When the layer thickness $T_s$ is from 0.10 to 0.30 mm, the liquid absorbed from the nozzle forming surface or the fixed liquid matter dissolved in or swollen with the cleaning liquid can be moved to the back surface layer side in a short time. In addition, it is possible to make it easier to scrape off the dried and fixed liquid adhering to the nozzle forming surface.

The thickness of the surface layer can be measured as follows. First, the surface layer is placed on an optical surface plate and a stainless steel disk having a diameter of 25 mm and a thickness of 3 mm is stacked on the surface layer at a position where the layer thickness is to be calculated to measure the thickness of the surface layer at 10 seconds after the surface layer is stacked. Using a laser distance sensor (HG-C1030, manufactured by Panasonic Corporation), the distance from the top of the stainless steel disk to the surface of the optical surface plate is measured. The thickness 3 mm of the stainless steel disk is subtracted from the thus-obtained distance to calculate the thickness of the surface layer. In addition, as the surface layer to be measured, a layer of a wiping member not laminated yet or a layer separated from laminated layers of a wiping member can be used.

The layer thickness of the back surface layer (an example of the layer thickness $T_b$ of a layer having a surface not in contact with the nozzle forming surface) is not particularly limited and can be appropriately adjusted to suit to an application. For example, it is preferably from 0.20 to 0.40 mm. When the layer thickness $T_b$ is from 0.20 to 0.40 mm, the liquid absorbed from the nozzle forming surface or a lysate in which the fixed liquid matter is dissolved in or swollen with the cleaning liquid can be easily held. In addition, since the liquid or lysate is easily held, the liquid can be removed by the wiping member in a state where the amount of liquid on the nozzle forming surface is small so that damage to the nozzle forming surface due to wiping can be reduced. Moreover, the mounting amount of the wiping member can be reduced and the size of the wiping device can be reduced.

In addition, the thickness of the back surface layer can be measured as for the measuring the thickness of the surface layer.

Further, the total thickness (thickness of the wiping member) of the surface layer and the back surface layer may be restricted in terms of reducing the size of the wiping member. In that case, it is preferable that the thickness of the back surface layer be larger than the thickness of the surface layer in terms of making the entire of the wiping member absorb a suitable amount of the liquid. That is, it is preferable to satisfy the following relationship 2.

$$T_s < T_b$$

Porosity

The porosity of the surface layer (an example of the layer thickness $T_s$ having a layer having a surface in contact with the nozzle forming surface) and the porosity of the back surface layer (an example of the layer thickness $T_b$ of a layer having a surface not in contact with the nozzle forming surface) are independently preferably 50 percent or more and more preferably from 50 to 95 percent in terms of holding the liquid absorbed from the nozzle forming surface and a lysate in which the fixed liquid matter is dissolved in or swollen with the cleaning liquid. When the porosity is 50 percent or more, the liquid or lysate can be sufficiently absorbed inside the wiping member. When the porosity is 95 percent or less, a sufficient capillary force can be obtained when the liquid or lysate is wiped off from the nozzle forming surface and the liquid absorption power is enhanced.

The porosity of the surface layer and the back surface layer can be measured as follows. First, the bulk density of each layer is calculated from the thickness and the mass per unit area of each layer in the wiping member. At this time, the thickness of each layer is measured according to the measuring method described above. Next, the porosity of each layer per unit volume is calculated from the ratio between the calculated bulk density and the true density of the material constituting each layer in the wiping member.

Moreover, it is preferable that the porosity Ps of the surface layer be larger than the porosity Pb of the back surface layer. That is, it is preferable to satisfy the following relationship 3.

$$Ps > Pb$$

Since the porosity of the surface layer is larger than the porosity of the back surface layer, the liquid or lysate wiped off from the surface layer can be moved to the back surface layer and the liquid or lysate is prevented from flowing backward from the back surface layer to the surface layer.

Fiber Diameter

The fiber diameter of the surface layer (an example of the fiber diameter Fs of a layer having a surface in contact with the nozzle forming surface) and the fiber diameter of the back surface layer (an example of the fiber diameter Fb of a layer having a surface not in contact with the nozzle forming surface) are independently preferably from 5 to 20 µm in terms of maintaining the wiping property. The fiber diameter of each layer is suitably adjusted based on the knowledge that as the fiber diameter increases, it is easier to maintain voids against a strong compression and it is easier to scrape the fixed matter of liquid from the nozzle forming surface, and as the fiber diameter decreases, the capillary force can be increased when absorbing the liquid.

In addition, the fiber diameter of the surface layer and the back layer is measured as follows. That is, the cross section or surface of each layer of the wiping member is measured using a laser microscope OLS4100, manufactured by Olympus Corporation to obtain a fiber diameter at five places of the fiber portion in the eyesight and the average is determined as the fiber diameter of each layer of the wiping member. In addition to the method of measuring the fiber diameter by magnifying with a microscope, etc., conventionally using denier (unit represented in gram of the mass of 9,000 meter yarn) and tex (denier definition changed from 9,000 meter to 1,000 meter), the fiber diameter can be obtained from the material (density) of a fiber.

Moreover, it is preferable that the fiber diameter of the surface layer be larger than the fiber diameter of the back surface layer. That is, it is preferable to satisfy the following relationship 4.

$$Fs > Fb$$

As described above, regarding the wiping member of the present embodiment, the properties of the surface layer and the back surface layer such as the thickness, the porosity, and the fiber diameter can be independently and suitably adjusted. Also, when the absorption power for the liquid and the lysate is imparted to the back surface layer, the liquid and the lysate are easily absorbed to the entire of the wiping member and also it is possible to prevent deterioration of the wiping property by re-transferring the absorbed liquid and lysate to the nozzle forming surface.

Cleaning Liquid

The cleaning liquid that may be carried in the wiping device dissolves and swells the dried liquid adhering to the nozzle forming surface and facilitates wiping. Also, it serves as a lubricant during wiping. The liquid wiped from the nozzle forming surface by the wiping member may contain solids such as a pigment. However, such solids may act as an abrasive to the nozzle forming surface during wiping and may degrade the water repellent film on the nozzle forming surface. Therefore, by setting the proportion of the cleaning liquid applied to the nozzle forming surface to the liquid present on the nozzle forming surface to 90 percent by mass or more, it is possible to prevent the water-repellent film on the nozzle forming surface from deteriorating ascribable to the lubricating action during wiping of the cleaning liquid. It is also preferable to accommodate the cleaning liquid in a container, which is installed onto a wiping device.

The cleaning liquid preferably contains, for example, an organic solvent, water, a surfactant, a defoaming agent, a preservatives and fungicides, a corrosion inhibitor, and a pH regulator. As the organic solvent, it is preferable to contain, for example, a lower alcohol etc. Moreover, as the lower alcohol, ethylene glycol, etc. are preferable. A cleaning liquid containing a lower alcohol such as ethylene glycol easily dissolves and swells the dried liquid adhering to the nozzle forming surface and has high volatility. Due to this, such a cleaning liquid strikes a balance between a high level of cleaning effect and the effect of preventing the remnant from remaining on the nozzle forming surface, thereby improving the wiping property.

Liquid

The ink, which is an example of the liquid carried in the liquid discharging device, is described below. The liquid is not limited to this and may be, for example, a pre-processing liquid to be applied to a recording medium before ink discharging and a post-processing liquid to be applied to an ink film of the recording medium after ink discharging.

The ink is not particularly limited and, for example, preferably contains an organic solvent, water, a coloring material, a resin, a surfactant, a defoaming agent, a preservatives and fungicides, a corrosion inhibitor, and a pH regulator. An example of the coloring material is a pigment. It is preferable that an ink container as an example of the liquid container be filled with the ink as an example of the liquid and mounted on the liquid discharging device.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but not limited thereto.

First, a method of measuring the thickness, the porosity, and the fiber diameter of each layer in the wiping member manufactured in Example and Comparative Examples will be described.

Layer Thickness

First, each layer of the wiping member is placed on an optical surface plate and a stainless steel disk having a diameter of 25 mm and a thickness of 3 mm was stacked on the layer at a position where the thickness was to be calculated to measure the thickness of the layer at 10 seconds after the layer was stacked.

Using a laser distance sensor (HG-C1030, manufactured by Panasonic Corporation), the distance from the top of the stainless steel disk to the surface of the optical surface plate was measured. The thickness 3 mm of the stainless steel disk was subtracted from the thus-obtained distance to calculate the thickness of each layer. In addition, the thickness of each layer was obtained by separately measuring the sample before laminating.

Porosity

The bulk density of each layer was calculated from the thickness and the mass per unit area of each layer in the wiping member. At this time, the thickness of each layer was measured according to the measuring method described above. Next, the porosity of each layer per unit volume was calculated from the ratio between the calculated bulk density and the true density of the material constituting each layer.

Fiber Diameter

The fiber diameter of each layer in the wiping member was determined by measuring the cross section or surface of each layer with a laser microscope OLS4100 (manufactured by OLYMPUS CORPORATION). The fiber diameter was obtained from five places of the fiber portion in the field of view and the average thereof was determined as the fiber diameter of each layer in the wiping member.

Examples 1 to 5 and Comparative Examples 1 to 2

Manufacturing of Wiping Member

A sheet-like prototype sample with a width of 30 mm and a length of 100 cm having the properties (thickness, porosity, fiber diameter, material) shown in Table 1 below was prepared. Next, each of two different prototype samples was combined by a thermal bond method as a layer (surface layer) having a surface in contact with the nozzle forming surface and a layer (back surface layer) having a surface not in contact with the nozzle forming surface, respectively, to manufacture a wiping member having two layers of Examples 1 to 3, 5 and Comparative Example 1. In addition, the wiping member of Comparative Example 1 was manufactured being subject to smoothing treatment under a pressure to the surface layer. In Example 4, a single prototype sample was used to manufacture a single layered wiping member. In Comparative Example 2, a commercially available sample (single-layer cellulose nonwoven fabric, manufactured by Asahi Kasei Corporation) having the properties (thickness, porosity, fiber diameter, material) shown in Table 1 below was cut into a width of 30 mm and a length of 100 cm to manufacture a single-layer wiping member.

In Table 1, PET represents polyethylene terephthalate, PE represents polyethylene, and PP represents polypropylene. In Table 1, PET/PE represents a core-sheath type composite fiber composed of PET and PE, PP/PE represents a core-sheath type composite fiber composed of PP and PE, and PP/PE+Cellulose represents a mixture of a core-sheath type composite fiber composed of PP and PE and a cellulose fiber.

Evaluation on Spreading of Liquid in Wiping Member

A coloring liquid composed of distilled water and edible red No. 104 (manufactured by Daiwa Dyestuff Mfg. Co., Ltd.) was prepared. The proportion of the edible red No. 104 to the total amount of the coloring liquid was 0.2 percent by mass. Next, using a micropipette 00-NPP-100 (manufactured by Nichiryo Co., Ltd.), 15 µL of the coloring liquid was dripped onto the wiping member with the surface layer upward (in other words, the wiping member set with the surface layer opposite to the direction of gravity). After the dripping, spreading of the coloring material was photographed every second from the surface layer side and the back surface layer side simultaneously with a CCD camera (acA2500, manufactured by Basler AG). The spreading area Ss on the surface layer side and the spreading area Sb on the back surface layer side were calculated from the red region (coloring material spreading area). For the spreading area Ss and the spreading area Sb, the values 60 seconds after the coloring liquid was dripped were adopted. The values of the spreading area Ss, the spreading area Sb, and Sb/Ss are shown in Table 1.

Evaluation on Fixability

The printer (IPSiO SG3100, manufactured by Ricoh Co., Ltd.) was remodeled to make it possible to print images, etc., on a glass plate (Tempax®) of 75 mm×25 mm×1 mm, manufactured by SCHOTT AG. The print pattern 10 mm×10 mm having a density equivalent to 50 percent gray was uniformly printed on the glass plate. Thereafter, the print pattern was dried at room temperature (25 degrees C.) for 15 hours to complete a print plate.

Next, the prepared print plate was wiped in an environment of 10 degrees C. and 15 percent RH by the following wiping method using each wiping member to obtain the wiping ratio obtained by quantifying the removal area ratio of the print pattern. The wiping property was evaluated according to the following evaluation criteria. The results are shown in Table 1.

Wiping Method

Using the wiping device for a liquid discharging head illustrated in FIG. 3, the print plate was wiped three times at 50 mm/s while the wiping member was pressed against the print plate by a semi-cylindrical polytetrafluoroethylene pressing member having a diameter of 10 mm and a length of 30 mm. Prior to wiping, 50 µL of ethylene glycol as a cleaning liquid was dripped onto the wiping member and the portion of the wiping member where the cleaning liquid was dripped was used for wiping.

Evaluation Criteria

A: Wiping ratio was 60 percent or more
B: Wiping ratio was from 20 to less than 60 percent
C: Wiping ratio was less than 20 percent

TABLE 1

|  |  | Surface Layer | Back surface layer | Spreading property | Wiping property |
|---|---|---|---|---|---|
| Example 1 | Thickness (mm) | 0.10 | 0.20 | Sb/Ss: 1.1 Sb: 50 mm² Ss: 46 mm² | A |
|  | Porosity (percent) | 95 | 88 |  |  |
|  | Fiber diameter (µm) | 16 | 13 |  |  |
|  | Material | PET/PE | PP/PE + cellulose |  |  |

TABLE 1-continued

| | | Surface Layer | Back surface layer | Spreading property | Wiping property |
|---|---|---|---|---|---|
| Example 2 | Thickness (mm) | 0.10 | 0.30 | Sb/Ss: 1.0<br>Sb: 49 mm² | A |
| | Porosity (percent) | 95 | 93 | Ss: 48 mm² | |
| | Fiber diameter (μm) | 16 | 17 | | |
| | Material | PET/PE | PP/PE + cellulose | | |
| Example 3 | Thickness (mm) | 0.30 | 0.40 | Sb/Ss: 0.9<br>Sb: 18 mm² | A |
| | Porosity (percent) | 95 | 95 | Ss: 19 mm² | |
| | Fiber diameter (μm) | 16 | 17 | | |
| | Material | PET/PE | PP/PE | | |
| Example 4 | Thickness (mm) | | 0.30 | Sb/Ss: 1.0<br>Sb: 45 mm² | A |
| | Porosity (percent) | | 88 | Ss: 43 mm² | |
| | Fiber diameter (μm) | | 11 | | |
| | Material | | PET | | |
| Example 5 | Thickness (mm) | 0.10 | 0.20 | Sb/Ss: 1.1<br>Sb: 30 mm² | A |
| | Porosity (percent) | 82 | 95 | Ss: 28 mm² | |
| | Fiber diameter (μm) | 15 | 20 | | |
| | Material | PET/PE | Cellulose | | |
| Comparative Example 1 | Thickness (mm) | 0.10 | 0.20 | Sb/Ss: 0.8<br>Sb: 38 mm² | C |
| | Porosity (percent) | 78 | 97 | Ss: 78 mm² | |
| | Fiber diameter (μm) | 16 | 17 | | |
| | Material | PET/PE | PP/PE | | |
| Comparative Example 2 | Thickness (mm) | | 0.55 | Sb/Ss: 1.2<br>Sb: 45 mm² | B |
| | Porosity (percent) | | 88 | Ss: 37 mm² | |
| | Fiber diameter (μm) | | 12 | | |
| | Material | | Cellulose | | |

In Comparative Example 2, fiber scraps of the wiping member adhering in the vicinity of the nozzle after wiping were present.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A wiping device comprising:
   a wiping member configured to wipe a nozzle forming surface of a liquid discharging head that discharges a liquid from a nozzle, the wiping member comprising fabric; and
   a pressing member configured to press the wiping member to the liquid discharging head,
   wherein the wiping member satisfies the following relationship 1:

$$0.8<(Sb/Ss)<1.2, \quad \text{relationship 1,}$$

where, at 60 seconds after a coloring liquid containing a coloring material and distilled water is dripped onto a surface of the wiping member in contact with the nozzle forming surface and Ss represents a spreading area of the coloring material on the surface of the wiping member in contact with the nozzle forming surface and Sb represents a spreading area of the coloring material on a surface of the wiping member not in contact with the nozzle forming surface.

2. The wiping device according to claim 1, wherein the wiping member comprises at least two layers.

3. The wiping device according to claim 2, wherein a thickness Ts of a layer of the at least two layers having the surface in contact with the nozzle forming surface and a thickness Tb of a layer of the at least two layers having the surface not in contact with the nozzle forming surface satisfy the following relationship 2:

$$Ts<Tb.$$

4. The wiping device according to claim 2, wherein a porosity Ps of a layer of the at least two layers having the surface in contact with the nozzle forming surface and a porosity Pb of a layer of the at least two layers having the surface not in contact with the nozzle forming surface satisfy the following relationship 3:

$$Ps>Pb.$$

5. The wiping device according to claim 2, wherein a layer of the at least two layers having the surface in contact with the nozzle forming surface has a thickness Ts of from 0.10 to 0.30 mm.

6. The wiping device according to claim 2, wherein a layer of the at least two layers having the surface not in contact with the nozzle forming surface has a thickness Tb of from 0.20 to 0.40 mm.

7. The wiping device according to claim 1, wherein the wiping member is impregnated with a cleaning liquid.

8. A wiping member comprising:
   fabric,
   wherein the wiping member satisfies the following relationship 1:

$$0.8<(Sb/Ss)<1.2 \quad \text{relationship 1,}$$

where, at 60 seconds after a coloring liquid containing a coloring material and distilled water is dripped onto a surface of the wiping member in contact with the nozzle forming surface, Ss represents a spreading area of the coloring material on the surface of the wiping member in contact with the nozzle forming surface and Sb represents a spreading area of the coloring material on a surface of the wiping member not in contact with the nozzle forming surface.

9. A liquid discharging device comprising:
   the wiping device of claim 1; and
   the discharging head.

10. A wiping method comprising:
    wiping a nozzle forming surface of a liquid discharging head that discharges a liquid from a nozzle with a wiping member comprising fabric, wherein the wiping member satisfies the following relationship 1:

$$0.8 < (Sb/Ss) < 1.2, \quad \text{relationship 1,}$$

where, at 60 seconds after a coloring liquid containing a coloring material and distilled water is dripped onto a surface of the wiping member in contact with the nozzle forming surface, Ss represents a spreading area of the coloring material on the surface of the wiping member in contact with the nozzle forming surface and Sb represents a spreading area of the coloring material on a surface of the wiping member not in contact with the nozzle forming surface.

* * * * *